United States Patent [19]

Moore

[11] Patent Number: 4,708,354
[45] Date of Patent: Nov. 24, 1987

[54] VEHICLE STEERING STABILIZER
[76] Inventor: George B. Moore, 7501 E. 80th South, Tulsa, Okla. 74133
[21] Appl. No.: 927,571
[22] Filed: Nov. 6, 1986
[51] Int. Cl.⁴ .............................................. B62D 7/08
[52] U.S. Cl. ....................................... 280/94; 267/150
[58] Field of Search .......................... 280/94, 93, 95 R; 267/150

[56]            References Cited
           U.S. PATENT DOCUMENTS 3,448,991  6/1969  Leggett ................................... 280/94
3,848,885 11/1974  Hefren .................................... 280/94
3,980,315  9/1976  Hefren .................................... 280/94
4,181,318  1/1980  Applegate ............................... 280/94
4,213,626  7/1980  Moore ..................................... 280/94

Primary Examiner—John J. Love
Assistant Examiner—Kenneth R. Rice
Attorney, Agent, or Firm—Robert K. Rhea

[57]            ABSTRACT

A steering stabilizer apparatus for connection with the steering components of a knee action type vehicle front wheel suspension system which biases the steerable wheels toward a straight forward neutral position.

5 Claims, 3 Drawing Figures

VEHICLE STEERING STABILIZER

BACKGROUND OF THE INVENTION

1. Field of the Invention.

This invention relates to vehicle steering controls and more particularly to a stabilizer for selected vehicles utilizing a 1½ or 2 ton A-frame permitting a "knee action" sprung condition of either steerable wheel relative to the vehicle frame or other wheel.

2. Description of the Prior Art

U.S. Pat. Nos. 3,848,885 and 3,980,315 both disclose spring biased steering stabilizers connecting the steering linkage to a bracket fixed to the frame forward cross member.

U.S. Pat. No. 3,448,991 discloses a steering stabilizer featuring a precompressed spring assembly connected with the brake drum forwardly and rearwardly of the respective wheel turning axis.

My U.S. Pat. No. 4,213,626 discloses a steering stabilizer for trucks having a one piece forward axle and king pins at each end supporting steerable wheels. The devices of these patents are not generally readily adaptable for use on trucks or recreational vehicles of the above mentioned type whereas the device of this invention is easily connected with such vehicles.

SUMMARY OF THE INVENTION

This stabilizing apparatus includes an angle bracket having a portion longitudinally clamped to the respective steering knuckle arm and provided with a depending clevis portion disposed forwardly of the respective wheel turning axis. A second bearing bracket, mounted on the lower control arm features a horizontally apertured divider slidably supporting an elongated shaft projecting therethrough and pivotally connected at one end with the angle bracket clevis. A pair of compression springs respectively surround the shaft on opposite sides of the divider.

The principal object of this invention is to provide a steering stabilizer easily connected with a vehicle for normally maintaining the steerable wheels in a forward to rear neutral position, which resists any sudden misaligning force and generally assists the driver in maintaining steering control of the vehicle.

DESCRIPTION OF THE PREFERRED EMBODIMENTS

Figure 1:
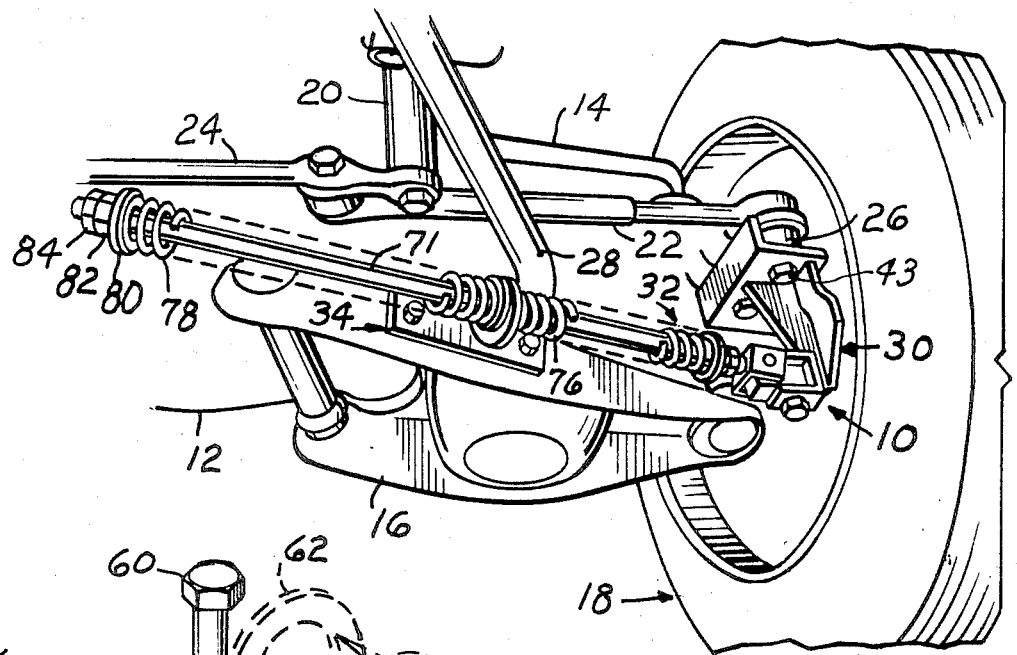
FIG. 1 is fragmentary perspective view illustrating the steering stabilizer in operative position on a vehicle.
Figure 3:
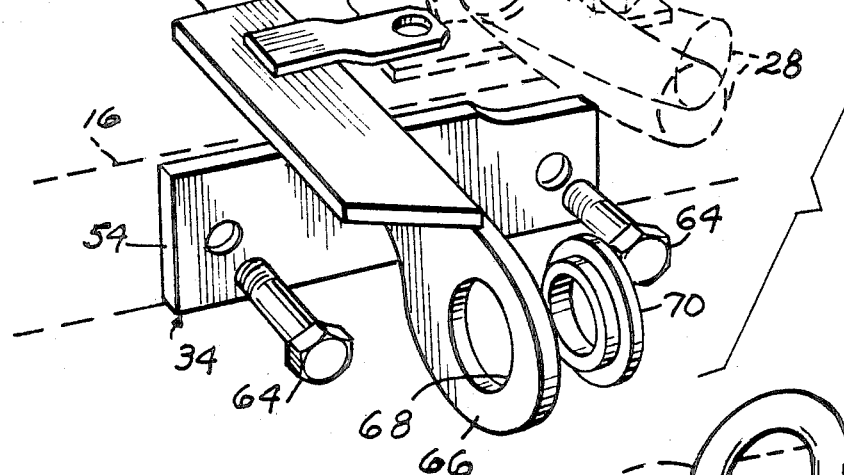
Figure 2:
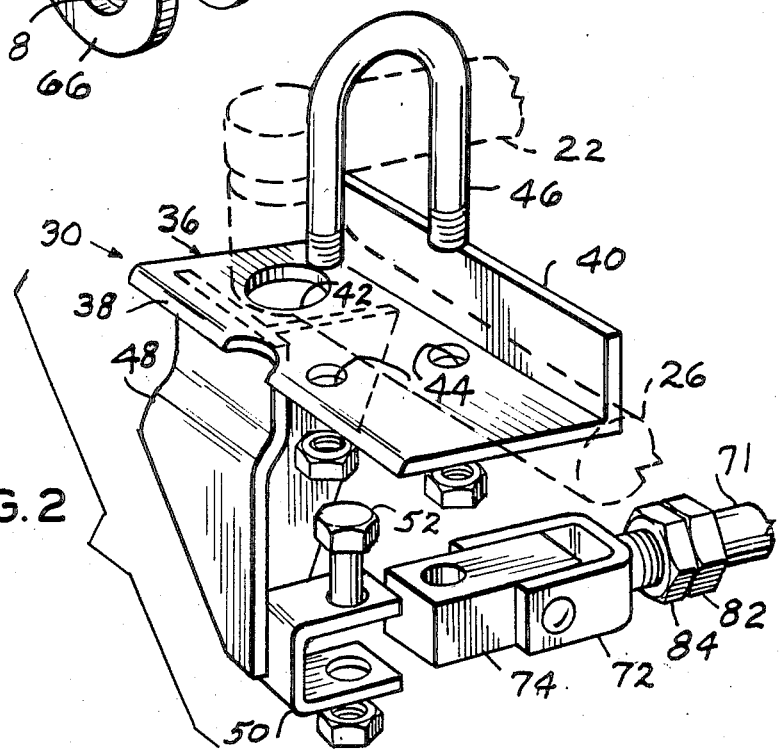
FIG. 2 is a fragmentary partially exploded perspective view, to a larger scale, of the steering knuckle arm connecting bracket from the opposite side of that shown by FIG. 1; and, FIG. 3 is a partially exploded perspective view illustrating the manner of mounting the fixed bracket spring support on the respective wheel lower control arm.

Like characters of reference designate like parts in those figures of the drawings in which they occur.

In the drawings:

The reference numeral 10 indicates the steering stabilizer apparatus, as a whole, connected with the left front wheel assembly of a vehicle. In the interest of brevity only the left front wheel assembly and the steering apparatus 10 will be described in detail, it being understood that the right hand wheel assembly and its stabilizer, neither being shown, are substantially equal and opposite. The vehicle includes a forward transverse frame cross member 12 pivotally connected at its left end portion with one end portion of upper and lower A-frame members herein referred to as upper and lower control arms 14 and 16, respectively. The other end portions of the control arms 14 and 16 are conventionally connected with a steering knuckle supporting a wheel and tire assembly 18 for horizontal turning movement about a substantially vertical axis.

Additionally the vehicle includes a steering wheel operated pitman arm 20 connected with interconnected tie rods 22 and 24 respectively connected with the right and left wheel assemblies 18 by steering knuckle arms 26, only one being shown, connected with the respective steering knuckle and projecting horizontally forward substantially parallel with the vertical plane of the wheel and tire.

The above description is conventional with vehicles of the type referred to and is set forth to show the combination with which the present invention is used.

The apparatus 10 includes a steering arm or control bracket 30 connected with one end of a spring and shaft assembly 32 longitudinally slidably supported by a guide or bearing bracket 34 fixed to the lower control arm 16.

The control bracket 30 includes an elongated right angular top portion 36 having a horizontal flange 38 longitudinally underlying in continuous contacting relation the forward end portion of the steering knuckle arm 26 and a vertical flange 40 adjacent the side of the steering knuckle arm opposite the wheel and tire 18. The forward end of the horizontal flange 38 is vertically apertured, as at 42, for nesting the nut 43 securing the steering knuckle arm 26 to the tie rod 22 and stabilizing the angle member 36 on the steering knuckle arm. The flange 38 is further vertically apertured intermediate its ends, as at 44, for receiving the legs of a U-shaped clamp 46 straddling the steering knuckle arm 26 and rigidly securing the bracket thereto.

The bracket 30 further includes a leg 48 of selected length depending from the forward end portion of the angle member 36 and offset laterally toward the brake drum assembly, not shown. A clevis 50 is rigidly secured to the depending end portion of the bracket leg 48 with the axis of the clevis bolt 52 substantially vertically disposed.

The bearing bracket 34 comprises an elongated base plate 54 and an elongated top plate 56 right angularly overlying the base plate with the planes of the plates substantially normal to each other. One end portion of the top plate supports a laterally extending vertically apertured lug 58. The bearing bracket 34 is mounted on the lower control arm 16 by removing the inwardmost bolt 60, connecting the stabilizer rod bracket 62 to the lower control arm 16, and reinserting the bolt 60 through the aperture in the lug 58. This locates the bracket 34 relative to the lower control arm so that the base plate 54 is adjacent the forward surface thereof. The base plate is provided with an aperture in its respective end portion which serves as locations for drilling holes through the lower control arm and inserting bolts 64 therethrough to firmly anchor the bracket to the lower control arm.

The other or forwardly disposed end portion of the top plate 56 rigidly supports a forwardly projecting vertically disposed planar divider 66 having a horizontal aperture 68. A friction reducing bushing 70, formed from synthetic material such as Nylon, is nested by the aperture 68 and forms a friction reducing bearing surface which pivotally and longitudinally slidably receives the shaft 71 of the spring assembly 32.

One end of the spring shaft 71 is rigidly connected with a second clevis 72 pined to one end portion of a link 74 having it other end portion vertically apertured for receiving the control bracket clevis bolt 52. This permits vertical pivoting movement of the spring shaft 71 about the horizontal axis of its clevis pin and horizontal pivoting movement of the control bracket clevis 50 relative to the shaft link 74.

A pair of compression die springs 76 and 78, preferably formed from chrome vanadium steel, surround the respective end portions of the spring shaft 71 and abut opposing sides of the divider 66. A suitable washer 80 is disposed at the respective end of each spring 76 and 78 and a spring tension adjusting nut 82 and lock nut 84 are threadedly connected with the respective end portion of the spring shaft. The spring 76 is shorter in length than the spring 78 and is disposed at the wheel end of the shaft 71.

OPERATION

In operation the apparatus 10 is installed as described hereinabove and with the wheels in neutral position the shaft spring adjusting nuts are tightened against the springs to compress them governed by a length predetermined in accordance with the components involved including a tighter adjustment of one of the vehicle right hand springs to compensate for normal steering component pull caused by the roadway crown. Thereafter turning movement of the wheels about its turning axis, as by movement of the steering wheel arm 20 or objects encountered by the wheels on the roadway, is resisted by one or the other of the springs 76 or 78. For example, if the wheel is turned to the left, as viewed in the drawings, the spring 76 is compressed and tends to return the wheel to a neutral forward or straight ahead direction when released. Conversely when the wheel is turned in the opposite direction the other spring 78 is compressed with similar result.

Obviously the invention is susceptible to changes or alterations without defeating its practicability. Therefore, I do not wish to be confined to the preferred embodiment shown in the drawings and described herein.

I claim:

1. In a vehicle front suspension system having an upper and a lower control arm assembly connecting a steerable wheel assembly supporting steering knuckle to a frame cross member for vertical movement of the wheel assembly relative to the frame cross member between an unsprung and a sprung condition and horizontal turning movement of the wheel assembly about a generally vertical turning axis and having a steering control connected by steering rods with a generally horizontal forwardly extending rigidly connected steering knuckle arm, the improvement comprising:

control bracket means rigidly secured to said steering knuckle arm and having a clevis portion remote from the steering knuckle arm and disposed forwardly of the turning axis, said control bracket means including a right angle member having one flange longitudinally underlying in contiguous contacting relation said steering knuckle arm and having an adjoining upstanding flange adjacent the steering knuckle arm opposite the wheel assembly and having an aperture adjacent one end of the underlying flange nesting the steering rod connected end portion of said steering knuckle arm;

clamp means connecting the other end portion of the angle underlying flange to the steering knuckle arm;

bearing bracket means secured to the forwardly disposed surface of the lower control arm including a vertical forwardly projecting horizontally apertured spring divider;

spring assembly means including a shaft supported intermediate its ends by said bearing bracket means for longitudinal reciprocating movement of the shaft relative to the bearing bracket means, said spring assembly means including a pair of compression springs respectively surrounding opposing end portions of said shaft on opposite sides of its bearing supported position;

spring tension adjusting means on the respective end portions of said shaft; and, pivoting joint means connecting one end of said shaft with the control bracket arm clevis portion for a universal joint type action of the clevis portion relative to the longitudinal axis of the shaft.

2. The combination according to claim 1 in which the bearing bracket means includes:

a forwardly projecting spring divider surrounding said shaft between confronting end surfaces of said springs; and, a friction reducing bearing pivotally and longitudinally slidably supporting said shaft within said divider.

3. The combination according to claim 2 in which each spring of said pair of springs is under predetermined compression in the neutral or straight ahead position of the steerable wheel assembly.

4. The combination according to claim 3 in which the spring divider forms a reactance member against which the respective spring is compressed in resisting turning movement of the steerable wheel assembly when steered in a respective direction about its turning axis.

5. The combination according to claim 4 in which the spring tension adjusting means comprises:

nut means threadedly connected with the respective end of said shaft.

* * * * *